United States Patent [19]

Crewe

[11] Patent Number: 4,760,567
[45] Date of Patent: Jul. 26, 1988

[54] ELECTRON BEAM MEMORY SYSTEM WITH ULTRA-COMPACT, HIGH CURRENT DENSITY ELECTRON GUN

[75] Inventor: Albert V. Crewe, Palos Park, Ill.

[73] Assignee: Electron Beam Memories, Palo Alto, Calif.

[21] Appl. No.: 895,199

[22] Filed: Aug. 11, 1986

[51] Int. Cl.⁴ .............................................. G11B 7/00
[52] U.S. Cl. .................... 369/101; 369/100; 250/310; 365/118; 365/128; 365/217
[58] Field of Search .................. 369/32, 33, 101, 100, 369/284; 365/128, 118, 217; 250/306, 396, 311, 310

[56] References Cited

U.S. PATENT DOCUMENTS

| | | | |
|---|---|---|---|
| Re. 30,974 | 6/1982 | DeMoss et al. | 369/44 |
| 3,113,179 | 12/1963 | Glenn | 178/6.6 |
| 3,116,962 | 1/1964 | Glenn et al. | 346/77 |
| 3,168,726 | 2/1965 | Boblett | 340/173 |
| 3,239,602 | 3/1966 | Lemelson | 178/6.6 |
| 3,278,679 | 10/1966 | Newberry | 178/6.6 |
| 3,361,873 | 1/1968 | Johnson et al. | 178/6.7 |
| 3,423,524 | 1/1969 | Bradford | 365/128 |
| 3,626,184 | 12/1971 | Crewe | 250/49.5 |
| 3,723,978 | 3/1973 | Maffitt | 365/128 |
| 3,731,095 | 5/1973 | Komoda | 250/49.5 |
| 3,737,589 | 6/1973 | Redlich et al. | 179/100.3 |
| 3,750,117 | 7/1973 | Chen et al. | 340/173 |
| 3,786,268 | 1/1974 | Nomura | 250/306 |
| 3,842,217 | 10/1974 | Clemens | 179/100.4 |
| 3,952,146 | 4/1976 | Plows et al. | 178/6.6 |
| 3,978,338 | 8/1976 | Ueno et al. | 250/396 |
| 4,001,493 | 1/1977 | Cone | 358/127 |
| 4,010,318 | 3/1977 | Riddle | 358/178 |
| 4,020,353 | 4/1977 | Saito et al. | 250/441 |
| 4,052,614 | 10/1977 | Fletcher et al. | 250/306 |
| 4,074,313 | 2/1978 | Reisner et al. | 358/128 |
| 4,099,055 | 7/1978 | Todokoro | 250/311 |
| 4,245,159 | 1/1981 | Beisswenger | 250/396 |
| 4,274,035 | 6/1981 | Fukuhara et al. | 315/357 |
| 4,420,686 | 12/1983 | Onoguchi et al. | 250/306 |
| 4,427,886 | 1/1984 | Martin et al. | 250/310 |
| 4,534,016 | 8/1985 | Kirkpatrick et al. | 365/128 |
| 4,600,839 | 7/1986 | Ichihashi et al. | 250/310 |

OTHER PUBLICATIONS

Field Emission Scanning Electron Microscopes with Parallel Plate Gun Electrodes, R. Shimizu et al, Scanning Electron Microscopy/1973 (Part I), Proc. of the (List continued on next page.)

Primary Examiner—William M. Shoop, Jr.
Assistant Examiner—Brian Young

[57] ABSTRACT

A rapid random accessed electron beam memory system comprises a disc mounted for rotation and supporting an information storage medium. An electron gun is mounted for movement across the disc. The gun has ultra-compactness and extremely low mass, yet is capable of developing a finely focused electron beam probe at high beam current densities. The gun comprises a low-mass field emission cathode, the cathode having an emitting tip and being adapted to receive a predetermined electrical potential to form a high brightness electron source at the tip. An electrostatic focus lens forms a real image of the electron source in the vicinity of the storage medium. The lens comprises a first electrode adapted to receive a predetermined second electrical potential which is positive relative to the potential on the tip and has a value effective to extract electrons from the tip. The electrode defines a relatively small aperture for deforming the diameter of an electron beam which is formed. A second electrode located downbeam of the first electrode is adapted to receive an adjustable third, focusing, electrical potential which is negative relative to the second electrical potential, and said second electrode having an aperture which is larger than the first electrode aperture. A third electrode located downbeam of the second electrode is adapted to receive a fourth, accelerating, electrical potential which is positive relative to the third potential for accelerating the beam, the third electrode having an aperture which is also larger than said first electrode aperture. The second, third and fourth electrical potentials are selected to establish beam-focusing fields between said first and second and between said second and said third electrodes. The gun has an ultra-low mass in order to make feasible rapid random accessing of any area of the storage medium.

20 Claims, 4 Drawing Sheets

OTHER PUBLICATIONS

Sixth Annual Scanning Electron Microscope Symposium, pp. 73-79.

Some Space Charge Effects in Electron Probe Devices, Optik, A. V. Crewe, Rev. Sci. Instru., vol. 52, No. 4, 337-346 (1978-79).

Electron Gun Using a Field Emission Source, A. V. Crewe, Rev. Sci. Instru., vol. 39, No. 4, 576-583, Apr. 1985.

A High Resolution Scanning Electron Microscope, A. V. Crewe, Jour. App. Phys., vol. 39, No. 13, 5861-5868, Dec., 1968.

Dramatic Desk-Type S.E.M. Performance Upgrade; Real-Time Images with 100A Resolution, Jour. of Elect. Eng. Design (Japan), Nov./Dec., 1975 (page unknown).

Field Emission Scanning Electron Microscope-S310A (Sales Brochure), 7 pages, Hitachi, Ltd., Tokyo, Japan.

Recent Advances in Electron Beam Memories, J. Kelly, in Advances in Electronics and Electron Physics, ed. by L. Morton, Academic Press, 1977.

A Short History of Television Recording, A. Abramson, JSMPTE, vol. 82, Mar. 1973, pp. 188-198.

Target Design of an Archival Electron Beam Memory, J. Wolfe, J. App. Phys. 53 (12), Dec., 1982, pp. 8429-8435.

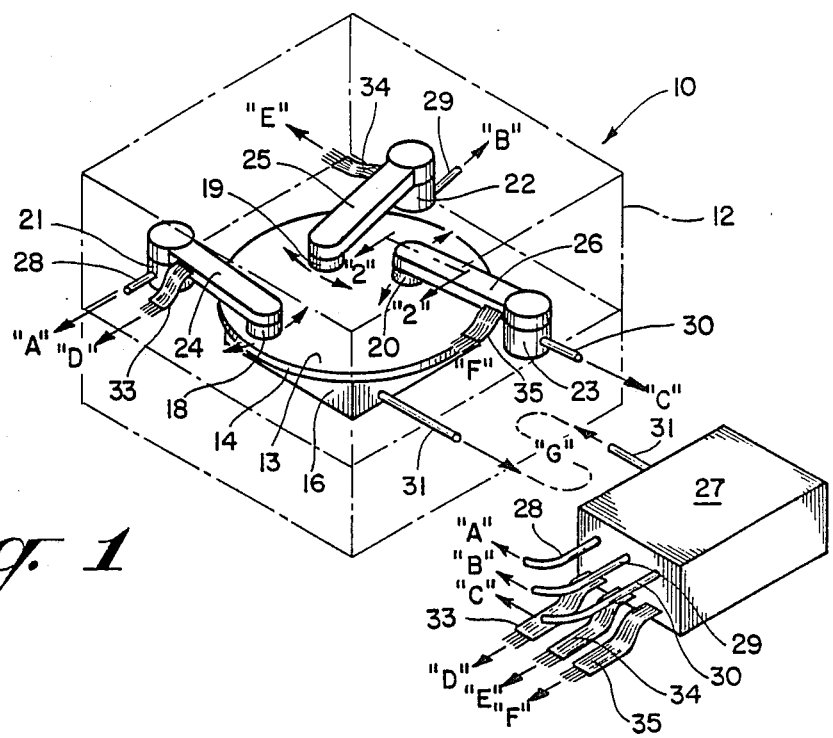

ELECTRON BEAM MEMORY SYSTEM WITH ULTRA-COMPACT, HIGH CURRENT DENSITY ELECTRON GUN

CROSS REFERENCE TO RELATED APPLICATIONS

This application is related to, but in no way dependent upon, my copending applications Ser. No. 825219, filed 2/3/86, Ser. No. 909015, filed 9/18/86, Ser. No. 895200, filed 8/11/86, and Ser. No. 895202, filed 8/11/86.

BACKGROUND OF THE INVENTION

Prior Electron Beam Memory Systems

The technological society in which we live appears to have an insatiable appetite for the storage of data, but there is a significant mismatch between the amount of data (particularly in digital form) and the devices currently available to store such data.

Examples of the need for digital storage are not difficult to find. Computer programs of 10–100 megabytes are not uncommon. To simply record social data in our population of 250 million people might require $10^6$ megabytes of storage. Images of various forms need considerable storage capacity—a single television frame may require two megabytes while a full color page of a magazine needs 10 times that amount. A year's supply of images from a single LANDSTAT satellite system has been estimated at $10^{15}$ bits.

It is also very apparent that the new Fifth Generation Computer will require a vast data base for its effective implementation. One might consider a base as large as the Library of Congress with perhaps $10^{16}$ bits.

Presently available data storage devices are totally inadequate to store this volume of digital information. For example, a magnetic hard disc system can typically store about $4 \times 10^9$ bits of information. Optical disc systems can store in the order of $5 \times 10^{10}$ bits. There is an obvious need, then, for a system which could store $10^{14}$ bits or more of information in digital form.

There are also substantial benefits which are not quite so apparent. For example, the existence of a vast memory on line would obviate destroying interim data and would allow its retrieval at any time. In such areas as image processing for a program development, this could be a very substantial benefit.

It is perhaps obvious that in order to develop memories of substantially greater storage capacity, resort must be had to the use of electrons or other charged particles with wavelengths less than the wavelength of light, or a system which does not depend upon radiation. Visible light is entirely inadequate; optical storage systems are already close to the wavelength limit of visible light.

Electron beam recording and retrieval of information has been explored for many years in laboratories and in some cases, practiced commercially. In the television field, there has been developed the now-commercial diffraction-type optical projection system in which electrostatic charges are deposited by an electron beam on a thermally softenable tape. Upon heating of the tape, the surface of the tape is deformed in accordance with the pattern of electrostatic charges. The television picture information stored on the surface-deformed tape is displayed by projecting a coherent beam of light through the transparent tape and spatially filtering the information diffracted by the surface deformations (R1, R2). An exhaustive treatment of television recording is given by Abramson (R2A).

Another approach is disclosed in the literature which follows this same general electron recording beam technique, but electron beams are used to read out the stored information by detection of emitted secondary electrons (R3). The literature describes a similar disc-based system which can be played mechanically, as well as by the use of electron beams to stimulate secondary emission from the thermoplastic medium (R4, R5, R6). There is also disclosed the application of the same thermoplastic recording technique in a real-time disc, tape or drum mass memory electron beam reading/erasing system with simultaneous optical read-out in vacuum (R7).

Others have suggested using electron beam recording to make mechanically readable video disc grooves by using a laterally vibrated electron beam to form the grooves in the disc (R6, R8).

Electron beams have been used to read out the surface deformations formed on an electrostatically deformed thermoplastic medium which has been negatively charged to create an electron mirror at the medium surface (R9).

Substantial engineering efforts have been expended developing video disc recording and retrieval technology—mainly optical and mechanical, but also using electron beams. An electron beam recording system has been developed for making the masters for capacitance-based (mechanical) video disc systems (R10). The prior art also includes a technique for an archival electron beam accessed memory in which a high intensity electron beam selectively melts columnar bits in a two-dimensional lattice supported by a thin membrane (R11).

It is clear that a disc-based system is best for quick access to high density information. In spite of the obvious need for an ultra-high density memory system and the obvious choice of electron beam radiation as the means by which the information is stored, no practical electron beam memory system has yet been developed because of the inability of the art to develop an electron gun having the requisite properties and capabilities.

Requirements of a Writing Gun for a Practical Rapid Random Accessed Electron Beam Memory System The writing gun must be ultra-compact and have a mass of no more than a few hundred grams to make possible random accessing in a few seconds or less of any selected file or area on the disc. Rapid random access to any disc file is necessary for making additions or corrections to files at any location on the disc. Further, since the gun or guns used to read out the information will inevitably have to have the capability of rapid random accessing of any file or area of the target disc, the writing electron gun, in order to be functionally and structurally compatible with the reading gun system, must also be movable relative to the disc.

The writing gun must be ultra-compact also for the reason that it not physically interfere with the reading gun or guns which may be operating simultaneously with the writing gun. Because of the vast amount of information storable in an electron beam memory system, it will not be desirable in many applications to permit the awaiting of storage of all information, which might take weeks or months, before any of the stored information can be accessed. Hence the need for a system with multiple reading and writing guns.

Further, the writing electron gun must be capable of developing a writing probe current of sufficiently high current density to make possible surface ablation or other power-intensive no-develop recording. The advantage of no-develop recording is that the information recorded can be read out immediately without the need to devacuate the system, develop the record medium, and re-evacuate the system.

Yet, the gun's accelerating voltage can be no more than a few kilovolts if undue beam penetration and spreading is to be avoided. Low voltages are desirable also in the interest of minimizing the bulk and mass of the voltage insulating structures required and thus minimizing the size and mass of the gun.

The writing electron gun for a practical electron beam memory system must also be capable of producing a writing probe having a diameter small enough to achieve the desired ultra-high recording densities.

Limitations of Prior Electron Beam Memory Guns Render Them Useless for the Contemplated Application It is most important to an appreciation of the significance of the invention to understand why previous electron beam memory guns have failed to meet the minimum needs of a practical electron beam memory system. There have been a number of disc-based electron beam memory systems disclosed in the literature in which the electron beam writing gun or head is movable. RCA has disclosed in the literature a disc-type electron beam recording system for use in making video disc masters (R12, R10). In this system the electron probe diameter is said to be 4 microns by 0.1 micron—far too large for use in the ultra-high density electron beam memory system with which this invention is concerned. The disclosed electron optical column is massive and adapted to be moved unidirectionally across the master disc upon which information is being recorded. The column is of far too great a mass and size to be usable in a system requiring a rapid random accessing writing head.

Teldec discloses in the patent literature a system for recording video information on a disc which employs a movable electron beam head (R6). The head is shown schematically, however the beam probe diameter is said to be 1 micron—far too large for use in a practical ultra-high density electron beam memory system.

The prior art also discloses a number of disc-based electron beam memory systems employing stationary electron beam writing columns. A number optically read out the stored information (R13, R14, R15, R5). In every case the electron optical column is far too cumbersome to give the requisite rapid random access capability of the commercially practicable electron beam memory system which I contemplate. Also, in every case the requisite combination of high beam current density and small probe size is not taught.

The prior art literature also discloses other systems which, while full details are not available, clearly appear to fall far short of the requisite capabilities in current density and probe size as well as compactness and low mass (R7, R16).

As will be discussed in more detail below, there is a basic incompatibility at relatively high electron beam current densities between the amount of electron current which can be developed in an electron beam probe and its minimum diameter. This is due to space charge effects which become significant as the electron density of an electron beam probe increases. In 1978 I showed in a very general context that the effects of space charge in an electron beam can be represented by a term proportional to the current, the length of the system, and the focal length and inversely proportional to the angle of convergence of the probe (R17). At the time I failed to realize the implications of this work in electron beam memory systems. As I will describe, I now see in the design of a practical electron gun for electron beam memory systems of the rapid random accessed type, the powerful implications of controlling the length of the gun's source-to-image distance.

Nor is an Electron Gun Having the Requisite Properties Available in Other Arts

Typical scanning electron microscope electron optical columns are monlithic structures totally unsuited for rapid movement across an electron beam memory medium. Further, they typically develop probe currents which would be, at best, marginal for a practical high rate, ultra-high density electron beam memory system of the type I contemplate.

In recent years, as a result of the development of field emission type electron guns, of which development I was instrumental (R18, R19), a scanning electron microscope with a less cumbersome, single focusing stage was developed (R20, R21, R22, R23, R24). The scanning electron microscope developments utilizing field emission guns represented a step in the direction toward an electron gun useful in an electron beam memory system of the type I contemplate, however, even these guns fall far short of what is needed. Whereas they are of reduced size and mass, these guns are nevertheless too massive to be utilized in an electron beam system having a rapid random accessing writing electron gun. These guns also fall short of the minimum electron probe current needed in a no-develop high recording rate electron beam memory system.

Electron beam lithography systems are capable of developing adequately high current densities in the electron beam probe, however, they are massive monolithic devices having no useful applicability in an electron beam memory system of the type I envision. They also operate with accelerating voltages which are far too high for this application. Reducing this voltage would impair performance.

My referent copending application Ser. No. (EBM-1) describes the claims in a rapid random accessing electron beam memory system a very compact, low mass field emission electron gun having a magnetic focus lens. It is an object of this invention to provide an electron beam memory system having an electron gun with a mass significantly less than the gun of the aforesaid copending application for even faster access times—a gun whose overall length is in the order of 1–2 centimeters or less, with a mass of less than 20 grams. An objective of 20 grams or less of mass rules out electron guns with a magnetic focus lens due to the mass of the focus coil and associated support structures.

Electrostatic gun systems are inherently simpler and less massive than guns with magnetic focusing. Focusing is accomplished by varying the potentials on metal electrodes rather than by establishing a magnetic field in an iron circuit using a copper coil of wire. The reduced mass of an electrostatic gun means that such guns can be more quickly moved by a given applied force. In addition, the voltages one needs to apply usually bears some simple relationship to one another, making possible the use of the simple voltage divider to provide the necessary potentials for the gun. In the case of electron guns with a field emission cathode and magnetic focusing, a voltage source is needed to establish the electron beam as well as a current source to establish the magnetic focusing field.

Electrostatically focused guns have the further attribute of requiring very little or no power for performing the focusing of the beam. Further, it is possible to obtain very short focal lengths with electrostatic lenses.

The disadvantages of electrostatic lenses are that voltages must be distributed in the kilovolt range to several closely spaced electrodes, with the possibility of electrical arcing between the electrodes. Importantly, the aberration coefficients are always considerably higher for electrostatic lenses than for magnetic lenses. This latter shortcoming means that the angular extent of the electron beam must be limited. That in turn means that the intensity of the probe current must necessarily be lowered. For an electron beam reading gun, this limitation may not be a disadvantage, but it imposes severe limitations for an electron gun used for information writing purposes where no-develop recording is essential.

The gun of this invention utilizes a three-electrode electrostatic focus lens of the so-called "Einzel" type. In general terms, three electrode Einzel electrostatic lenses are well known in cathode-ray tubes and other electron beam devices unrelated to this invention. I know of an electron microscope manufactured by Siemens Corporation having an Einzel type lens; however, that system lacked the compactness, ultra-low mass, high beam intensity and small probe size described and claimed herein.

In conclusion, I am not aware of any devices or disclosures either in the field of electron beam memory systems, or any other field, of an electron gun having the aforedescribed properties and minimum capabilities necessary for use in a rapid random accessed electron beam memory system.

PRIOR ART REFERENCES

A. Referenced above:
R1—U.S. Pat. No. 3,113,179
R2—U.S. Pat. No. 3,116,962
R2A—A Short History of Television Recording, A. Abramson, JSMPTE Vol. 82, March, 1973, pages 188-198
R3—U.S. Pat. No. 3,168,726
R4—U.S. Pat. No. 3,750,117
R5—U.S. Pat. No. 3,952,146
R6—U.S. Pat. No. 3,737,598
R7—U.S. Pat. No. 3,239,602
R8—U.S. Pat. No. 3,842,217
R9—U.S. Pat. No. 3,278,679
R10—U.S. Pat. No. 4,010,318
R11—Target Design of an Archival Electron Beam Memory, J. Wolfe, J. App. Phys. 53 (12), December 1982, pages 8429-8435
R12—U.S. Pat. No. 4,074,313
R13—U.S. Pat. No. 3,381,097
R14—U.S. Pat. No. 3,361,873
R15—U.S. Pat. No. RE: 30,974
R16—U.S. Pat. No. 4,001,493
R17—"Some Space Charge Effects in Electron Probe Devices" Optik, A. V. Crewe, 52 (1978/1979) No. 4, 337-346
R18—"Electron Gun Using a Field Emission Source", A. V. Crewe, Rev. Sci. Instru., Vol. 39, No. 4, 576-583, April 1985
R19—"A High Resolution Scanning Electron Microscope, A. V. Crewe, Jour. App. Phys., Vol. 39, No. 13, 5861-5868, December 1968
R20—"Dramatic Desk-Type S.E.M. Performance Upgrade; Real-Time Energies with a 100A Resolution", Jour. of Elec. Eng. (Japan), November/December 1975 (page unknown)
R21—"Field Emission Scanning Electron Microscope—S310A" (Sales Brochure, 7 pages, Hitachi, Ltd., Tokyo, Japan)
R22—U.S. Pat. No. 4,274,035
R23—U.S. Pat. No. 4,020,353
R24—U.S. Pat. No. 4,099,055
R31—U.S. Pat. No. 3,978,338
R32—U.S. Pat. No. 4,534,016

B. Not Referenced Above:
R25—U.S. Pat. No. 4,427,886
R26—U.S. Pat. No. 3,731,095
R27—U.S. Pat. No. 3,786,268
R20—Recent Advances in Electron Beam Memories, J. Kelly, in Advances in Electronics and Electron Physics, ed. by L. Morton, Academic Press, 1977
R30—U.S. Pat. No. 4,245,159
R33—U.S. Pat. No. 3,626,184
R34—U.S. Pat. No. 3,350,503
R35—U.S. Pat. No. 3,278,679
R36—Field Emission Scanning Electron Microscopes with Parallel Plate Gun Electrodes, R. Shimizu et al, Scanning Electron microscopy/1973 (Part I), Proc. of the Sixth Annual Scanning Electron Microscope Symposium, pp. 73-79.

OBJECTS OF THE INVENTION

It is an object of this invention to provide an electron beam memory system having an electron gun capable, for the first time, of high enough electron probe current densities to permit no-develop recording and small enough probe sizes to permit ultra-high density recording, yet of low enough mass to make feasible rapid random accessing of any area on the system's recording medium.

It is an object of this invention to provide a rapid random accessed electron beam memory system having an electron gun which is capable of developing electron beam probe current densities high enough to make feasible ablative or other no-develop recording at rates of 10 megahertz and above.

It is another object of this invention to provide a rapid random accessed electron beam memory system having an electron gun which achieves such current levels using accelerating voltages of no more than a few kilovolts.

It is still another object to provide a rapid random accessed electron beam memory system having an electron gun which is also capable of producing at such minimum probe currents and maximum accelerating voltages electron beam probe diameters of 500 angstroms or less in order to make feasible recording densities of at least $10^{14}$ bits of information on a 12 inch disc.

It is yet another object to provide a rapid random accessed electron beam memory system having an electron gun which is capable of these achievements, and yet which is ultra-compact and has a mass of only 20 grams or less in order to make feasible accessing of any selected file or area on the recording medium within 1-2 seconds or less.

It is an object to provide such a gun useful in a variety of electron beam devices in which compactness, low voltages, relatively high beam currents and small probe diameters are desired or required.

It is still another object to provide an extremely compact and low mass field emission electron gun of the electrostatic type for use in a variety of electron beam devices, having a novel set of parameters endowing it with a mass of less than 20 grams, yet rendering it capable of producing a relatively high intensity, but very small electron beam probe.

It is an object to provide such a gun which is useful for either writing or reading of information in an electron beam memory system.

BRIEF DESCRIPTION OF THE DRAWINGS

FIG. 1 is a highly schematic illustration of an electron beam memory system constructed according to the teachings of the present invention;

FIG. 2 is a perspective, partly sectioned view of a head constituting part of the FIG. 1 system and containing a writing or reading electron gun implementing an aspect of the present invention;

FIG. 3 is a sectioned side elevation view of the electron beam memory system head and electron gun shown in FIG. 2;

FIG. 4 is a diagram illustrating the manner in which integrated deflection and/or stigmatizing coils are wound on a mandrel constituting part of the FIGS. 2-3 gun;

FIGS. 5A, 5B and 5C are diagrams showing the manner in which an electron beam is deflected using integrated deflection coils constituting part of the FIGS. 2-3 gun.

DESCRIPTION OF THE PREFERRED EMBODIMENT

Figure 6:
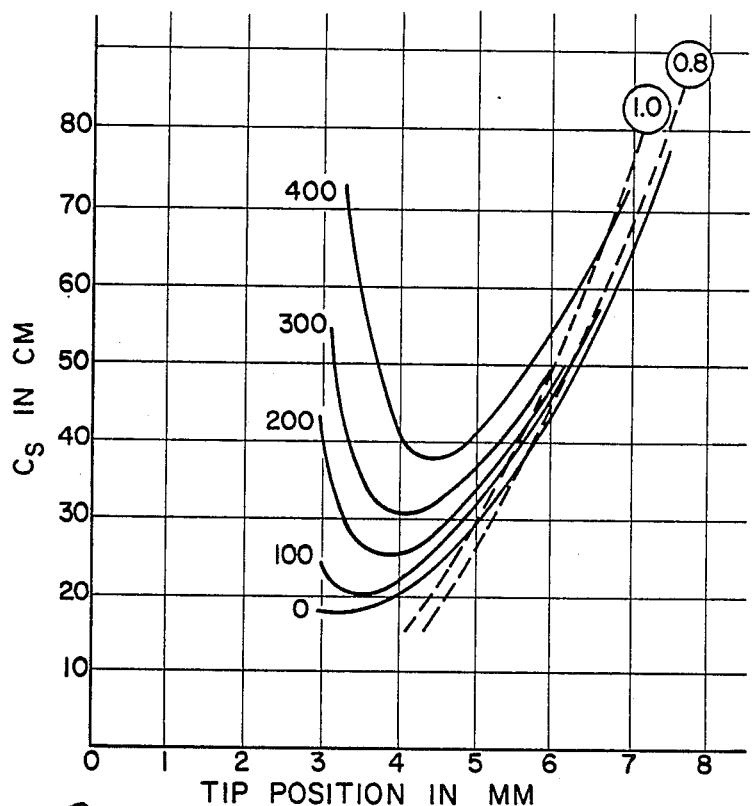
FIGS. 6-10 are diagrams depicting certain operating characteristics of the FIGS. 2-3 gun.
Figure 7:
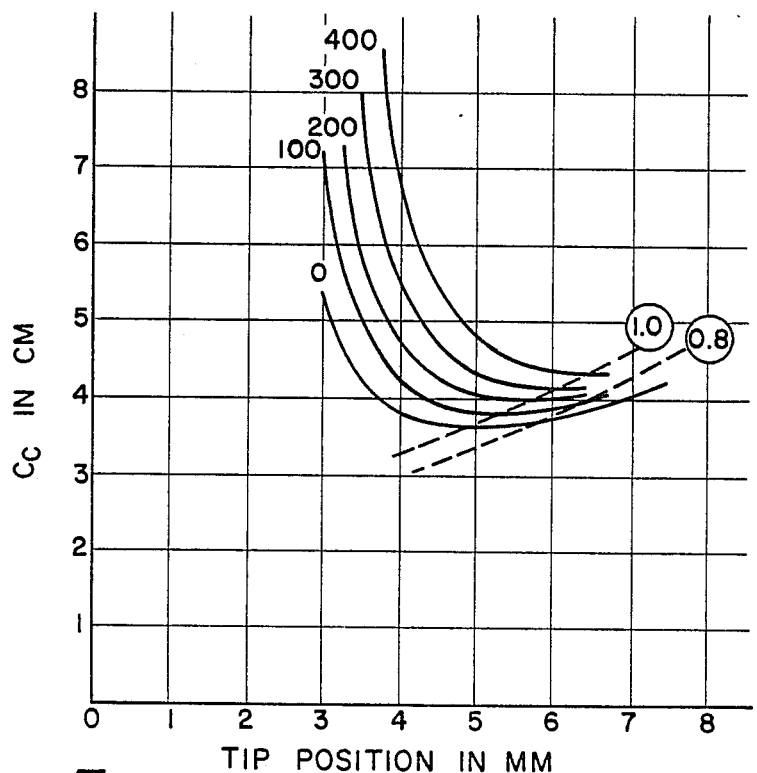
Figure 8:
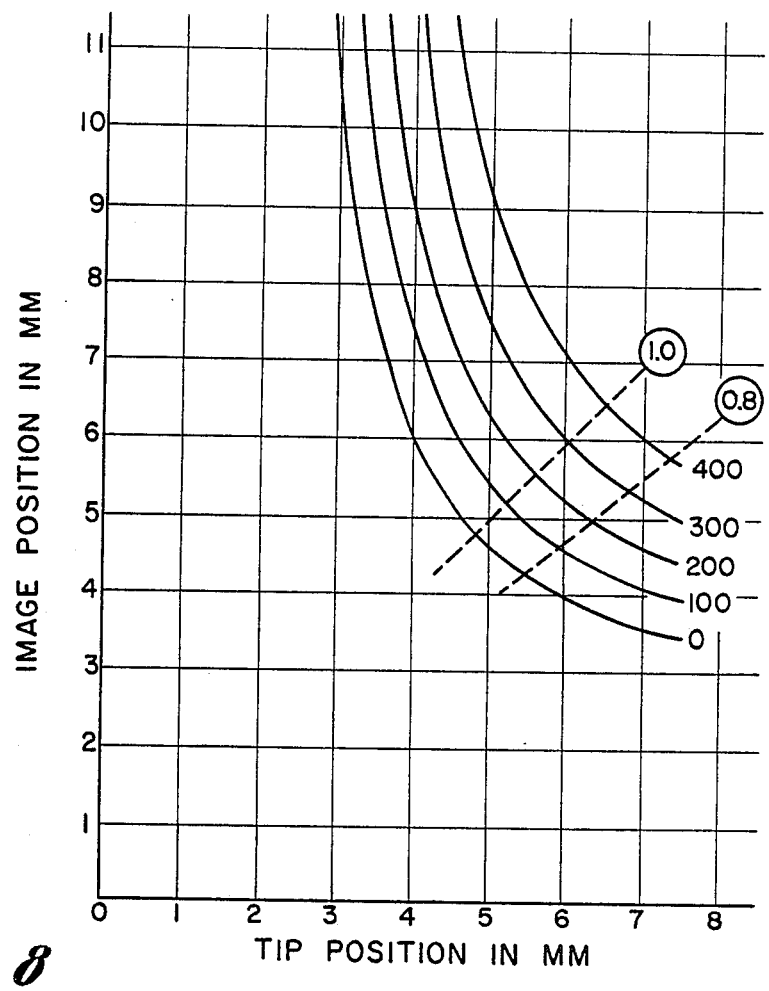
Figure 9:
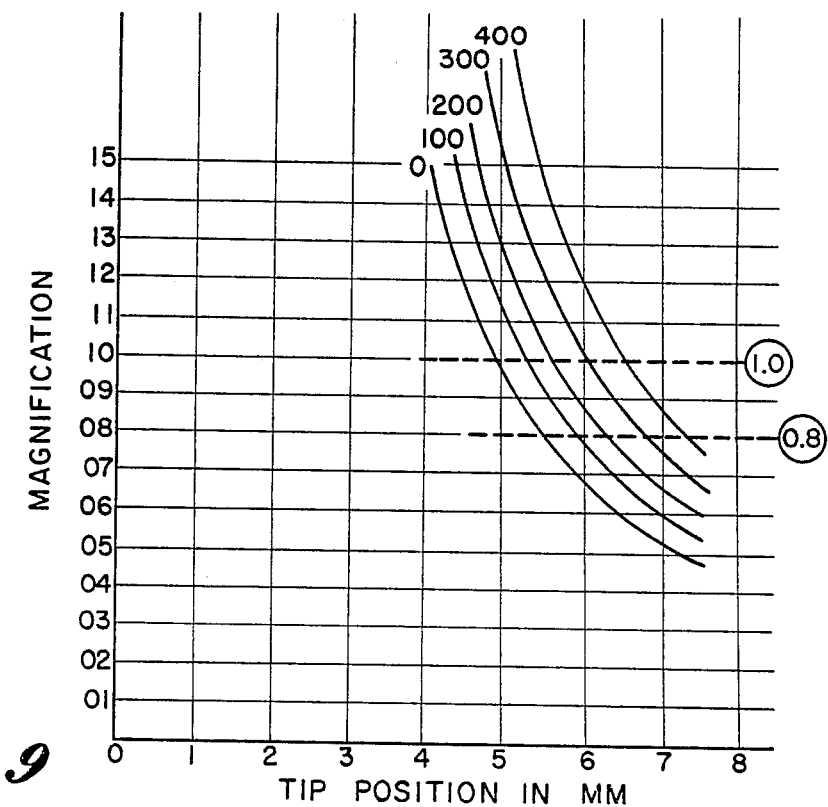
Figure 10:
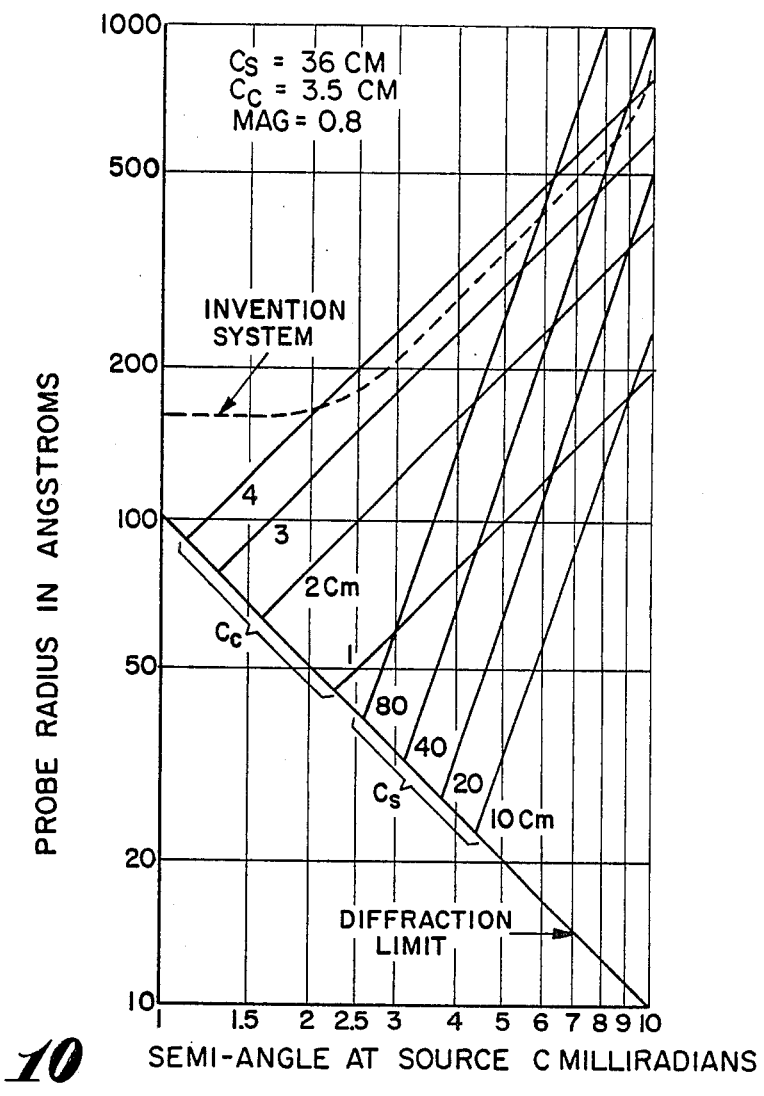

The electron gun according to the present invention has numerous uses in applications receiving or desirably utilizing ultra-compactness, extremely low mass and a relatively high current density. The most promising application envisioned is in an electron beam memory system.

FIG. 1 is a schematic view of an electron beam memory system 10 embodying the present invention. The FIG. 1 system 10 is shown as including a vacuum enclosure, depicted schematically in dotted line form at 12. Within the enclosure is a storage medium 13 supported on a rotatable disc 14. The disc 14 is rotated by a disc drive shown schematically at 16.

In nearly all disc-type electron beam memory systems disclosed in the prior art, the electron optical head or column is monolithic and immovable, requiring that the turntable be translated within the vacuum enclosure. Vacuum compatibility for such drive systems introduces lubrication and other problems. In the present system, the drive 16 is stationary and is therefore preferably located outside the vacuum enclosure 12. Further, compared with a system in which the turntable is moved, the vacuum enclosure volume is greatly reduced.

The electron beam memory system 10 includes a plurality of electron beam heads adapted for simultaneous operation. In the illustrated embodiment, I have shown three heads—a writing head 18 containing an electron gun for recording information, a verification head 19 containing an electron gun for verifying the fact and integrity of the stored information, and a reading head 20 containing an electron gun for retrieving the stored information.

The electron beam memory system 10 is illustrated schematically as including head drives 21, 22, 23 interconnected with the heads 18, 19, 20 by support arms 24, 25, 26 for moving the heads 18, 19, 20 across the disc 14.

Auxiliary electronic and electrical apparatus, shown schematically at 27, provides the necessary drive signals through conductors 28, 29, 30 for energizing head drives 21, 22, 23. Apparatus 27 also supplies through conductor 31 suitable drive signals for disc drive 16, as well as the necessary heater current for the field emission source heater and energization potentials for the gun electrodes through bundles of conductors 33, 34, 35.

FIG. 2 illustrates a writing electron gun 36 contained within writing head 18. As will be described, the FIG. 2 gun is capable of developing a finely focused electron beam probe at high beam current densities, yet is ultra-compact and of extremely low mass. For the first time, the electron gun of this invention makes possible a truly random accessed electron beam memory system for high rate, ultra-high density electron beam data recording, and yet with recording power making possible no-develop recording, i.e., recording without the need for developing the recording medium after exposure. With the writing electron gun according to this invention, a very high capacity electron beam storage medium can be employed using multiple accessory verification and reading heads to permit simultaneous recording and reading over long periods of time—a critically important capability for a great many applications. As noted above, because of the vast storage capability of an electron beam memory system such as this, it may be totally impractical in many applications to delay access to the memory until the memory is filled (which could take weeks or months), during which time the stored information is inaccessible.

An electron beam memory system becomes truly universally useful only when it has the capability as is now provided by this invention, to record without any development of the medium using a rapid random accessing head and with simultaneously operable pick-up heads for verifying and/or retrieving the stored information as soon as it is recorded.

Before engaging in a detailed discussion of the FIG. 2 electron gun practicing this invention, I will first discuss in general terms the performance requirements imposed on a writing gun of an electron beam memory system of the character described herein. A few of the performance, packaging and other requirements imposed on the gun are, in general terms, as follows: (1) as stated, the gun must be of sufficient compactness and low mass as to be readily capable of being rapidly accelerated and decelerated to effectuate a rapid random accessing of the electron beam memory medium; (2) the gun must be capable of producing an extremely fine probe to permit ultra-high density recording on the medium; (3) the probe produced must not only be extremely fine, but must have high current densities, in order that no-develop recording can be achieved—that is, recording characterized by an alteration of the physical state of the recording medium which can be detected immediately after recording, as by use of an electron beam probe; (4) the gun must be capable of working with relatively low accelerating voltages in order that the beam penetration and spreading is not excessive, and so that the insulation requirements do not drive up the size and mass of the gun; (5) the head must have a modest power consumption in order that massive cooling structures are not required; (6) the gun must have an electron source which not only is extremely bright, but is also stable and of long life in order that the system in practice is easy to use by operators of ordinary skill; and (7) the gun must have a commercially tolerable cost of manufacture.

The simplest way to effect an irreversible change in the physical state of the recording medium is to induce melting or boiling of the recording material to create a depression or pit in the medium. The pit can be detected, for example, with a less-intense electron beam probe and accompanying means for detecting secondary, back-scattered or transmitted electrons.

The melting temperature "Tm" of a material can be approximated by the relation $Tm=(31\ V/2\pi\ Ka)$, where "I" is the electron beam current in amperes, "V" is the beam voltage in volts, "K" is the thermal conductivity of the material in joules per centimeter squared per second, and "a" is the radius of the heated zone in the recording medium in centimeters.

Using bismuth as the recording material, for example, having "K"=0.02 and "Tm"=270 degrees centigrade, and assuming a beam voltage "V" of 5 kilovolts and a heated zone "a" of 0.08 microns, then "I"=160 nanoamperes. In practice, a temperature in excess of the melting point would be required in order to create a hole or pit.

Recording rates are limited by the rate at which the medium can be heated: $\gamma=(\rho\sigma a^2/K)$, where $\rho$ is the specific heat and $\rho$ is the density of the material. The recording rates for most materials and the probe diameters of interest is in the order of $10^{-8}$ to $10^{-10}$ seconds, allowing recording rates of 10 megahertz and above.

It was previously thought that current values in the range of 100-300 nanoamperes with accelerating voltages of 3-5 kilovolts, and a beam power in the range of 300-500 microwatts, for example, would be required to produce melting in materials such as bismuth, tellurium, arsenides of such materials and mixtures thereof.

Experiments conducted with the electron beam memory system described and claimed in my copending application Ser. No. 825219, however, have demonstrated that electron beam writing in such materials can be achieved at power density levels lower than indicated above.

As shown in FIGS. 2-3, an electron beam head/gun assembly in accordance with this invention is illustrated as including a vacuum manifold 38. Electron gun assembly 36 is appended to the vacuum manifold 38 and develops an extremely fine electron beam probe 40 of sufficient current density to write (record) tracks 42 on the storage medium 13 on disc 14.

The electron gun assembly 36 comprises an extremely axially compact structure, all components of the gun being optimized for axial compactness and minimization of mass. As will be described, the series of structures making up the electron gun assembly 36 are all essentially ring-like elements of metal or ceramic adapted to be brazed together by well-known techniques to make an extremely rugged and hermetically sealed structure.

The electron gun of this invention preferably utilizes a field emission cathode, however, for some applications not requiring well-known current or brightness probe diameters, other high brightness sources, such as heated lanthanum hexaboride, may be used.

The field emission cathode assembly shown in FIGS. 2-3 is described and claimed in my copending application Ser. No. 895202. The field emission cathode assembly comprises two metal rings 44, 46 between which is sandwiched a ceramic ring 48. The metal rings 44, 46 and ceramic ring 48 define circular apertures 52, 54 and 56 respectively. The rings 44, 46 are brazed to the ceramic ring; the metal ring 44 is welded to the vacuum manifold 38 to form a rigid hermetical seal therewith.

A filament 58 extends substantially diagonally across the apertures 52, 54, 56 formed in the rings 44, 46, 58 and has welded medially thereof a field emission tip 60. The tip 60 is aligned on the electron optical axis of the gun. When properly excited, the tip 60 emits an extremely small but intensely bright source of electrons.

The metal rings 44, 46 serve as expedient terminals for the application of filament heating currents for use in applications wherein the field emitter is heated. The out-turned ends 62, 64 of the filament 58 are welded to the rings 44 and 46, respectively, from which rings the filament 58 may derive a source of appropriate electrical potential for extracting electrons from the tip 60. The use of rings 44, 46 as terminals for the application of heater currents has a decided advantage over bringing wire leads in through the enclosure for the field emitter. The provide a mechanically rugged, hermetically sealed assembly and, of equal importance, large area terminals which serve to dissipate heater current heat over a large terminal area, thus minimizing concern for failures of the terminals due to overheating. The use of a filament extending diagonally across the openings, rather than the common "hairpin" filament, has the further advantage of being less susceptible to vibration.

The electron gun assembly 36 further includes an electrostatic focus lens for forming a real image of the electron source produced at the field emission source in the vicinity of the recording medium 13. An electrostatic lens in accordance with this invention is illustrated as comprising a first electrode 66, a second electrode 68 and a third electrode 70. The first and second electrodes are dished-disc electrodes. The third electrode is a flat-disc electrode. The electrodes are spaced from each other by ceramic insulators 72, 74. The electrodes are spaced from the field emission cathode assembly by a ceramic insulator 76.

The electrodes 66, 68 and 70 and the insulators 72, 74 and 76 are brazed together to define a mechanically sound, hermetically sealed assembly.

The field emitter is adapted to receive a predetermined first electrical potential effective to form a high brightness electron source at the tip 60. The first electrode 66 is adapted to receive a predetermined second electrode electrical potential which is positive relative to the potential on the tip 60 and has a value relative to the first potential which is effective to induce emission of electrons from the tip 60. The first electrode 66 has a very small aperture 78 for determining the diameter of the electron beam which is formed.

The second electrode 68 is adapted to receive an adjustable third, focusing, electrical potential which is negative relative to the aforesaid second potential applied to the first electrode 66. The second electrode 68 defines an aperture 80 which is much larger than the aperture 78 in electrode 66, as will be discussed in more detail hereinafter.

The third electrode 70 is adapted to receive a fourth, accelerating, electrical potential which is positive relative to the potential applied to the second electrode 68. The fourth potential determines the energy of the electrons to be brought to a focus. The third electrode 70 defines an aperture 82 which is substantially larger than the aperture 78 in the first electrode 66, but smaller than the aperture 80 in the second electrode 68.

The second, third and fourth electrical potentials applied to the electrodes 66, 68 and 70 are selected to establish beam-focusing fields between the first and second electrodes 66, 68 and between the second and third electrodes 68, 70.

The enclosure defined by the first electrode 66, the rings 44, 46 and 48 and the vacuum manifold comprise an ultra-high vacuum zone for maintaining the field emitter at an appropriate vacuum level—typically $10^{-9}$ to $10^{-10}$ torr. The restricted size of the aperture 78 in the first electrode is selected, in part, with consideration for maintaining the high vacuum in the zone containing the field emitter.

Because of the necessity of minimizing the magnification of the electron source formed by the field emitting tip 60, the magnification of the source at the storage medium 13 is preferably 0.5–2.0. The objectives of system compactness and small probe sizes implies the use of relatively short object and image distances. As will become evident, when the dimensions of the system are as decribed below, these objectives result in insufficient room at the exit of the gun to use conventional beam deflection and stigmatizing systems.

The electron gun assembly 36 includes an integrated beam deflection and stigmatizing system following the principles set forth and claimed in my copending application Ser. No. 895200. The beam deflection/stigmatizing system is illustrated as comprising magnetic field generating means for establishing plural fields of magnetic flux through the electrostatic lens for modifying the position and cross-sectional shape of the beam. As shown in FIGS. 2-3, the magnetic field generating means comprises a system of magnetic windings 84 configured on an electrically insulative cylindrical sleeve-like mandril 86 surrounding the lens assembly.

The windings 84 are configured to provide both X and Y beam deflection as well as quadrupolar beam stigmatizing. The manner in which the windings 84 are wound is shown in the FIG. 4 diagram. The system of windings 84 includes X and Y beam deflection coils configured to create beam deflection fields for effecting static and/or dynamic deflection of the beam as it passes through the lens.

The system of windings 84 is also configured to create stigmatizing fields extending through the electrostatic lens and so defined as to correct cross-sectional asymmetries of the beam as it passes through the lens.

FIGS. 5A, 5B and 5C depict schematically the manner in which electron beam probe 40 is deflected within the electrostatic lens system itself to effect movement of the probe across the storage medium 13. It will be understood that in operation of the electron beam memory system, the heads 18, 19, 20 are moved across the disc to attain the gross positioning of electron beam during reading or writing operations. Fine positioning of the beam is achieved by use of the system of windings 84.

An electron beam deflection of only 10–20 microns is sufficient to span 100 tracks—a deflection completely adequate for recording or for locating and/or following or forming a particular track on the storage medium 13.

A more complete description of the illustrated integrated electron beam deflection and/or stigmatizing system and its features and attributes are described in my referent copending application Ser. No. (EMB-5).

Achievement of the design objectives set forth above require the optimization of at least the following sixteen differing parameters: the spacings (2), thicknesses (3), aperture diameters (3), outer radii (3) and potentials (3) of the the electrodes as well as the object and image distances (2).

Based largely on considerations of minimizing the spherical and chromatic aberration coefficients (the most significant factors), the following parameters are considered to be optimum for the particular system depicted. Other systems would have a different set of parameters. They may be varied somewhat from the range of values to be given. The interelectrode spacings between first electrode 66 and the second electrode 68 and between the second electrode 68 and the third electrode 70 (measured surface to surface on the beam axis) are each preferably about 0.5–2.0 millimeters.

The radius of the aperture 78 in the first electrode 66 is preferably about 6–20 microns. The second electrode aperture 80 is preferably within about 25% of 1.2 millimeters; the third electrode aperture 82 is preferably within about 25% of 0.4 millimeters. The outer radii of the electrodes 66, 68, 70 are not critical, but should be 5 or more times greater than the respective electrode apertures.

The radius of the first electrode aperture 78 is not critical as long as it is small relative to the radius of the second electrode aperture 80. The aperture 78 is used as the defining aperture for the beam—the system beam current can be determined by selection of an appropriate diameter of aperture 78. The spherical aberration in the system increases with increasing radius of the first and third electrode apertures 78, 82, but decreases slowly below about 0.2 millimeters. The spherial aberration in the system increases, however, with decreasing diameter of second electrode aperture 80.

The axial thickness of the first electrode is about 0.2–0.8 mm, preferably about 0.4 millimeter; the thickness of the second electrode 68 is substantially greater—about 1.0–1.4 mm, e.g., preferably about 1.2 millimeter; the third electrode has a thickness about the same as the first electrode—about 0.2–0.8 mm, preferably about 0.4 millimeter. The thickness of the center electrode 68 is the most critical. There is a relationship between the thickness and the radius of the second electrode. In the preferred embodiment described above, the aperture radius and thickness are the same—about 1.2 mm. The relative dimensions of these parameters can, however, be varied 2:1 in either direction.

It should be pointed out that the coefficient of chromatic aberration is almost entirely determined by the focal length. Adjustment of other parameters will have significantly less affect on chromatic aberration for a fixed object and image.

In a preferred embodiment, the spacing between the tip 60 and the first electrode 66 is preferably about 3–5 millimeters. For minimized probe size, it is desired that the system have magnification of 0.5–2.0. This means that the image distances are in the range of a few millimeters. With image distances of only a few millimeters, the criticality of the need for the integrated magnetic deflection/stigmatizing system described above can be seen.

The voltages applied to the electrodes 66, 68 and 70 may, for example, be 0, −5 to −6 kilovolts (variable), and 0 respectively, with an extraction potential applied to the tip 60 of 3–10 kilovolts, preferably about 5 kilovolts. It is desirable that the electron energies upon impact with the medium 13 be approximately equal to the extraction voltage (here both approximately 5 kilovolts).

A relatively low accelerating voltage is needed to control the depth of penetration of the electron beam probe into the storage medium. In writing applications, too-deep penetration would reduce the medium heating and impair melting of the medium. In reading applications, too-deep penetration might impair the resolution of the system. With the first, second, third and fourth potentials, the thickness and aperture diameters of said electrodes and the interelectrode spacings as given above, the electron beam current generated by the gun is in the range of about 20 to 500 nanoamperes and the beam probe has a diameter in the range of about 200 to 1000 angstroms.

In FIGS. 6–9 are shown the values of spherical aberration coefficient (Cs), chromatic aberration coefficient (Cc), image distance and magnification for the following set of parameters.

Interelectrode spacing (each), measured surface to surface, on axis is 1 mm.
Radius of electrode aperture 78 is 6–20 microns.
Radius of electrode aperture 80 is 1.2 mm.
Radius of electrode aperture 82 is 0.4 mm.
Thickness of electrode 66 is 0.4 mm.
Thickness of electrode 68 is 1.2 mm.
Thickness of electrode 70 is 0.4 mm.

In FIGS. 6–9, all distances are measured from the central electrode. The various curves show the behaviour of the gun as a function of the potential on the middle electrode. (The numbers refer to the kinetic energy of an electron at that point). The two dotted curves represent conditions of constant magnification (1.0 and 0.8 respectively) and are useful for choosing the final tip position—0.8 may be preferred.

In presenting the results, the values of Cs and Cc are given in somewhat unconventional terms, namely:

$$\delta_s(\text{image}) = C_s \alpha^3 (\text{source})$$

$$\delta_s(\text{image}) = (C_c \Delta V \alpha / V (\text{source}), \text{ where}$$

the emission angle at the source is used as the reference angle. The reason for this choice is that one is concerned not only with the size of the image, but also with the amount of current which can be obtained (determined by the source angle).

FIG. 6 shows a universal plot of probe size versus beam angle for various values of Cs and Cc, assuming a high voltage of 5000 volts and an energy speed of 1 volt. The beam angle can be assumed to be the source angle.

An electron beam memory system according to this invention must necessarily be very small with a total overall length from source tip 60 to probe of no greater than about 1–2 centimeters or less. The operating voltage of the electron beam will be in the range of about 3 to 10 Kv, the probe diameter will be in the range of 200–1000 angstroms depending upon the application, with a probe current in the range of 50–500 nA for a writing beam and 10–200 nA for a reading beam.

In accordance with one aspect of this invention, as aforestated, the electron gun according to this invention is ultra-compact and of extremely low mass. Specifically, the electron gun of this invention preferably has a total mass of no more than about 20 grams.

The electron gun 36 according to this invention is extraordinarily compact. By way of illustration, the total length of the gun is no more than about 0.5–1.0 centimeter. A gun having such extreme compactness and low mass is susceptible of being quickly moved to any part of the recording medium in order to effectuate rapid random accessing of any selected area on the medium for the purpose of adding information to any selected file or area on the medium.

The above embodiments are included merely as illustrative and it is contemplated that other structures may be devised to practice the teachings of the present invention. The following claims are intended to cover such other structures.

What is claimed is:

1. A rapid random accessed electron beam memory system comprising:
    disc means mounted for rotation and supporting an information storage medium;
    disc rotating means for rotating said disc; and
    an electron gun and means for moving said gun across said disc, said gun having ultra-compactness and extremely low mass, yet being capable of developing a finely focused electron beam probe at current densities appropriate for writing information on or reading information from said medium, said gun comprising:
        a low-mass cathode adapted to receive a predetermined first electrical potential to form a high brightness electron source;
        an electrostatic focus lens for forming a real image of said electron source in the vicinity of said recording medium, said lens comprising:
            a first electrode adapted to receive a predetermined second electrical potential which is positive relative to said first potential, said electrode having a relatively small aperture for determining the diameter of an electron beam which is formed,
            a second electrode located downbeam of said first electrode and adapted to receive an adjustable third, focusing, electrical potential which is negative relative to said second electrical potential, said second electrode having an aperture which is larger than said first electrode aperture, and
            a third electrode located downbeam of said second electrode and adapted to receive a fourth, accelerating, electrical potential which is positive relative to said third potential for accelerating said beam and determining the penetration of said bean into said storage medium, said third electrode having an aperture which is also larger than said first electrode aperture,
        said second, third and fourth electrical potentials being selected to establish beam-focusing fields between said first and second and said third electrodes.

2. A rapid random accessed electron beam memory system comprising:
    disc means mounted for rotation and supporting an information storage medium;
    disc rotating means for rotating said disc; and
    an electron gun and means for moving said gun across said disc, said gun having ultra-compactness and extremely low mass, yet being capable of developing a finely focused electron beam probe at current densities appropriate for writing information on or reading information from said medium, said gun comprising:

a low-mass cathode adapted to receive a predetermined first electrical potential and to form a high brightness electron source;

an electrostatic focus lens for forming a real image of said electron source in the vicinity of said recording medium, said lens comprising:

a first electrode adapted to receive a predetermined second electrical potential which is positive relative to said first potential, said electrode having a relatively small aperture for determining the diameter of an electron beam which is formed, a second electrode located downbeam of said first electrode and adapted to receive an adjustable third, focusing, electrical potential which is negative relative to said second electrical potential, said second electrode having an aperture which is larger than said first electrode aperture, and a third electrode located downbeam of said second electrode and adapted to receive a fourth, accelerating, electrical potential which is positive relative to said third potential for accelerating said beam and determining the penetration of said beam into said storage medium, said third electrode having an aperture which is also larger than said first electrode aperture, said second, third and fourth electrical potentials being selected to establish beam-focusing fields between said first and second and between said second and said third electrodes, said gun having a tip-to-third-electrode length of no more than about 1 centimeter and a mass no greater than about 20 grams in order to make feasible rapid random accessing of any area of said storage medium.

3. A rapid random accessed electron beam memory system comprising:

disc means mounted for rotation and supporting an information storage medium;

disc rotating means for rotating said disc; and an electron gun and means for moving said gun across said disc, said gun having ultra-compactness and extremely low mass, yet being capable of developing a finely focused electron beam probe at beam current densities appropriate for writing information on or reading information from said medium, said gun comprising:

a low-mass cathode, said cathode being adapted to receive a predetermined first electrical potential and forming a high brightness electron source;

an electrostatic focus lens for forming a real image of said electron source in the vicinity of said recording medium at a magnification of .5-2.0, said lens comprising:

a first electrode being adapted to receive a predetermined second electrical potential which is positive relative to said first potential, said electrode having a relatively small aperture for determining the diameter of an electron beam which is formed, a second electrode located downbeam of said first electrode and adapted to receive an adjustable third, focusing, electrical potential which is negative relative to said second electrical potential, said second electrode having an aperture which is larger than said first electrode aperture, and a third electrode located downbeam of said second electrode and adapted to receive a fourth, accelerating, electrical potential which is positive relative to said third potential for accelerating said beam and determining the depth of penetration of said beam into said storage medium, said third electrode having an aperture which is also larger than said first electrode aperture, said second, third and fourth electrical potentials being selected to establish beam-focusing fields between said first and second and between said second and said third electrodes, the said first, second, third and fourth potentials, the thickness and aperture diameters of said electrodes and the interelectrode spacings being such that the electron beam current generated by said gun is in the range of about 10 to 500 nanoamperes, and said beam probe having a diameter in the range of about 200 to 1000 angstroms.

4. The apparatus defined by claim 3 wherein the thickness and aperture radius of said second electrode are approximately equal.

5. The apparatus defined by claim 4 wherein the thicknesses of said first, second and third electrodes are, respectively, 0.2-0.8 mm, 1.0-1.4 mm, and 0.2-0.8 mm, and the potentials on said first, second and third electrodes are about 0, $-5$ to $-6$ and 0 kilovolts, respectively.

6. The apparatus as defined by claim 3 wherein said first electrode aperture has a radius in the range of 6-20 microns.

7. The apparatus defined by claim 6 wherein the radii of said second and said third electrode apertures are within about 25% of 1.2 mm and 0.4 mm, respectively.

8. The apparatus defined by claim 7 wherein the separation of said source and said first electrode is about 3-5 mm, the interelectrode spacings total within about 25% of 2 mm, and the total thickness of said first, said second and said third electrodes is within about 25% of 2 mm, whereby the overall length of the gun from said tip to exit from said third electrode is between about 0.5-1.0 centimeter.

9. A rapid random accessed electron beam reading or writing system comprising:

means supporting a surface to be probed with an electron beam; and an electron gun and means for effecting relative movement between said gun and said surface, said gun having ultracompactness and low mass, yet being capable of developing a finely focused electron beam probe at current densities appropriate for writing information on or reading information from said surface, said gun comprising:

a low-mass field emission cathode, said cathode being adapted to receive a predetermined first electrical potential and forming a high brightness electron source;

an electrostatic focus lens for forming a real image of said electron source in the vicinity of said surface, said lens comprising:

a first electrode being adapted to receive a predetermined second electrical potential which is positive relative to said first potential, said electrode having a relatively small aperture for determining the diameter of an electron beam which is formed, a second electrode located downbeam of said first electrode and adapted to receive an adjustable third, focusing, electrical potential which is negative relative to said second electrical potential, said second electrode having an aperture which is larger than said first electrode aperture, and a third electrode located downbeam of said first electrode and adapted to receive a fourth, accelerating, electrical potential which is positive relative to said third potential for accelerating said beam and determining the depth of penetration of said beam into said storage medium, said third electrode having an aperture which is also larger than said first electrode aperture, said second, third and fourth electrical potentials being selected to establish beam-focusing fields between said first and second and between said second and said third electrodes, the thickness and aperture radius of said second electrode being approximately equal.

10. A rapid random accessed electron beam memory system comprising:

disc means mounted for rotation and supporting an information storage medium;

disc rotating means for rotating said disc; and an electron gun and means for moving said gun across said disc, said gun having ultra-compactness and extremely low mass, yet being capable of developing a finely focused electron beam probe at beam current densities appropriate for writing information on or reading information from said medium, said gun comprising:

a low-mass field emission cathode, said cathode having an emitting tip and being adapted to receive a predetermined first electrical potential to form a high brightness electron source at said tip;

an electrostatic focus lens for forming a real image of said electron source in the vicinity of said recording medium, said lens comprising:

a first electrode adapted to receive a predetermined second electrical potential selected in relation to said first potential to effect an extraction of electrons from said tip and having a relatively small aperture for determining the diameter of an electron beam which is formed, a second electrode located downbeam of said first electrode and adapted to receive an adjustable third, focusing, electrical potential which is negative relative to said second electrical potential, said second electrode having an aperture which is larger than said first electrode aperture, and a third electrode located downbeam of second electrode and adapted to receive a fourth, accelerating, electrical potential which is positive relative to said third potential for accelerating said beam and determining the depth of penetration of said beam into said storage medium, said third electrode having an aperture which is also larger than said first electrode aperture, said second, third and fourth electrical potentials being selected to establish beam-focusing fields between said first and second and between said second and said third electrodes, said first electrode aperture having a radius in the range of 6-20 microns and said second and third electrode apertures having radii of within 25% of 1.2 mm and 0.4 mm, respectively.

11. A rapid random accessed electron beam memory system comprising:

disc means mounted for rotation and supporting an information storage medium;

disc rotating means for rotating said disc; and an electron gun and means for moving said gun across said disc, said gun having ultra-compactness and extremely low mass, yet being capable of developing a finely focused electron beam probe at beam current densities appropriate for writing information on or reading information from said medium, said gun comprising:

a low-mass field emission cathode, said cathode having an emitting tip and being adapted to receive a predetermined first electrical potential to form a high brightness electron source at said tip;

an electrostatic focus lens for forming a real imge of said electron source in the vicinity of said recording medium, said lens comprising:

a first electrode being adapted to receive a predetermined second electrical potential selected in relation to said first potential to effect an extraction of electrons from said tip and having a relatively small aperture for determining the diameter of an electron beam which is formed, a second electrode located downbeam of said first electrode and adapted to receive an adjustable, third, focusing, electrical potential which is negative relative to said second electrical potential, said second electrode having an aperture which is larger than said first aperture, and a third electrode located downbeam of said second electrode and adapted to receive a fourth, accelerating, electrical potential which is positive relative to said third potential for accelerating said beam and determining the depth of penetration of said beam into said storage medium, said third electrode having an aperture which is also larger than said first electrode, said second, third and fourth electrical potentials being selected to establish beam-focusing fields between said first and second and between said second and said third electrodes, the spacing between said tip and said first electrode being about 3-5 millimeters, the interelectrode spacings totaling within about 100% of 2 millimeters, the total thickness of said first, second and third electrodes being within about 100% of 2 millimeters, and the overall length of the gun from tip to exit from the third electrode is between about 0.5-1.0 centimeter.

12. A rapid random accessed electron beam recording or writing system comprising:

means supporting a surface to be probed with an electron beam; and an electron gun and means for effecting relative movement between said gun and said surface, said gun having ultracompactness and extremely low mass, yet being capable of developing a finely focused electron beam probe at current densities appropriate for writing information on or reading information from said surface, said gun comprising:
a low-mass cathode, said cathode being adapted to receive a predetermined first electrical potential and forming a high brightness electron source;
an electrostatic focus lens for forming a real image of said electron source in the vicinity of said surface, said lens comprising:
a first electrode being adapted to receive a predetermined second electrical potential which is positive relative to said first potential, said electrode having a relatively small aperture for determining the diameter of an electron beam which is formed,
a second electrode located downbeam of said first electrode and adapted to receive an adjustable third, focusing, electrical potential which is negative relative to said second electrical potential, said second electrode having an aperture which is larger than said first electrode aperture, and
a third electrode located downbeam of said second electrode and adapted to receive a fourth, accelerating, electrical potential which is positive relative to said third potential for accelerating said beam and determining the depth of penetration of said beam into said storage medium, said third electrode having an aperture which is also larger than said first electrode aperture,
said second, third and fourth electrical potentials being selected to establish beam-focusing fields between said first and second and between said second and said third electrodes,
said gun having a mass no greater than about 20 grams in order to make feasible rapid random accessing of any area of said storage medium, the thickness and aperture radius of said second electrode being about equal,
said first electrode aperture having a radius in the range of about 6-20 microns, and said second and third electrode apertures being within about 25% of 1.2 mm and 0.4 mm, respectively, the separation of said source and said first electrode being about 3-5 millimeters.

13. The apparatus defined by claim 12 wherein the thicknesses of said first, second and third electrodes are, respectively, about 0.2-0.8 mm, 1.0-1.4 mm and 0.2-0.8 mm.

14. The apparatus defined by claim 12 wherein the spacing of said source from said first electrode is about 3-5 mm, the interelectrode spacings totals within about 100% of 2 mm, the total thickness of said first, said second, and said third electrodes is within about 100% of 2 mm, and the overall length of the gun from source to exit from said third electrode is between about 0.5-1.0 centimeter.

15. A rapid random accessed electron beam memory system comprising:
disc means mounted for rotation and supporting an information storage medium;
disc rotating means for rotating said disc; and
an electron gun and means for moving said gun across said disc, said gun having ultra-compactness and extremely low mass, yet being capable of developing a finely focused electron beam probe at current densities appropriate for writing information on or reading information from said medium, said gun comprising:
a low-mass field emission cathode, said cathode having an emitting tip and being adapted to receive a predetermined first electrical potential to form a high brightness electron source at said tip;
an electrostatic focus lens for forming a real image of said electron source in the vicinity of said recording medium, said lens comprising:
a first electrode being adapted to receive a predetermined second electrical potential which is positive relative to said first potential and having a value in the range of 3-10 kilovolts effective to extract electrons from said tip, said electrode having a relatively small aperture for determining the diameter of an electron beam which is formed,
a second electrode located downbeam of said first electrode and adapted to receive an adjustable third, focusing, electrical potential which is negative relative to said second electrical potential, said second electrode having an aperture which is larger than said first electrode aperture, and
a third electrode located downbeam of said second electrode and adapted to receive a fourth, accelerating, electrical potential which is positive relative to said third potential for accelerating said beam and determining the depth of penetration of said beam into said storage medium, said third electrode having an aperture which is also larger than said first electrode aperture,
said second, third and fourth electrical potentials being selected to establish beam-focusing fields between said first and second and between said second and said third electrodes,
said gun having said mass no greater than about 20 grams in order to make feasible rapid random accessing of any area of said storage medium,
the said first, second, third and fourth potentials, the thickness and aperture diameters of said electrodes, and the interelectrode spacings being such that said electron beam current generated by said gun is in the range of about 10 to 500 nanoamperes, said beam probe has a diameter in the range of about 200-1000 angstroms, the thicknesses of said first, second and third electrodes are, respectively, 0.2-0.8 mm, 1.0-1.4 mm, and 0.2-0.8 mm, said first electrode has a radius of 6-20 microns, the radii of said second and said third electrode apertures is within about 25% of 1.2 mm and 0.4 mm, respectively, the separation of said tip and said first electrode is about 3-5 mm, the interelectrode spacings total within about 100% of 2 mm, and the overall axial length of the gun from tip to exit from said third electrode is between about 0.5-1.0 centimeter.

16. An electron gun having ultra-compactness and extremely low mass, yet being capable of developing a finely focused electron beam probe, said gun comprising:
a low-mass field emission cathode, said cathode having an emitting tip and being adapted to receive a predetermined first electrical potential to form a high brightness source at said tip;

an electrostatic focus lens for forming a real image of said electron source, said lens comprising:

a first electrode being adapted to receive a predetermined second electrical potential which is positive relative to said first potential and having a value effective to extract electrons from said tip, said electrode having a relatively small aperture for determining the diameter of an electron beam which is formed, a second electrode located downbeam of said first electrode and adapted to receive an adjustable third, focusing, electrical potential which is negative relative to said second electrical potential, said second electrode having an aperture which is larger than said first electrode aperture, and a third electrode located downbeam of said second electrode and adapted to receive a fourth, accelerating, electrical potential which is positive relative to said third potential for accelerating said beam, said third electrode having an aperture which is also larger than said first electrode aperture, said second, third and fourth electrical potentials being selected to establish beam-focusing fields between said first and second and between said second and said third electrodes, said gun having a mass no greater than about 20 grams, said first electrode aperture having a radius in the range of 6-20 microns, said second and third electrode apertures being within 25% of 1.2 mm and 0.4 respectively, and the separation of said tip and said first electrode being about 3-5 millimeters.

17. The apparatus defined by claim 16 wherein the thicknesses of said first, second and third electrodes are, respectively, 0.2-0.8 mm, 1.0-1.4 mm and 0.2-0.8 mm.

18. The apparatus defined by claim 16 wherein said first electrode aperture has a radius of 6-20 microns, and the radii of said second and said third electrode apertures are within about 25% of 1.2 mm and 0.4 mm, respectively.

19. The apparatus defined by claim 16 wherein the tip-to-first electrode distance is about 3-5 mm, the interelectrode spacings totals within about 100% of 2 mm, and the total thickness of said first, said second and said third electrodes is within about 100% of 2 mm, and the overall length of the gun from tip to exit from said third electrode is between about 0.5-1.0 centimeter.

20. An electron gun having ultra-compactness and extremely low mass, yet being capable of developing a finely focused electron beam, said gun comprising:

a low-mass field emission cathode, said cathode having an emitting tip and being adapted to receive a predetermined first electrical potential to form a high brightness electron source at said tip;

an electrostatic focus lens comprising:

a first electrode being adapted to receive a predetermined second electrical potential which is positive relative to said first potential and having a value in the range of 3-10 kilovolts effective to extract electrons from said tip, said electrode having a relatively small aperture for determining the diameter of an electron beam which is formed, a second electrode located downbeam of said first electrode and adapted to receive an adjustable third, focusing, electrical potential which is negative relative to said second electrical potential, said second electrode having an aperture which is larger than said first electrode aperture, and a third electrode located downbeam of said second electrode and adapted to receive a fourth, accelerating, electrical potential which is positive relative to said third potential for accelerating said beam, said third electrode having an aperture which is also larger than said first electrode aperture, said second, third and fourth electrical potentials being selected to establish beam-focusing fields between said first and second and between said second and said third electrodes, said gun having a mass no greater than about 20 grams, the said first, second, third and fourth potentials, the thickness and aperture diameters of said electrodes, and the interelectrode spacings being such that said electron beam current generated by said gun is in the range of about 10-500 nanoamperes, the thicknesses of said first, second and third electrodes are, respectively, about 0.2-0.8 mm, 1.0-1.4 mm and 0.2-0.8 mm, said first electrode aperture having a radius of 6-20 microns, the radii of said second and said third electrode apertures being within about 25% of 1.2 mm and 0.4 mm, respectively, the separation of said tip and said first electrode being about 3-5 mm, the interelectrode spacings totalling within about 100% of 2 mm, and the overall length of the gun from tip to exit from said third electrode is between about 0.5-1.0 centimeter.

* * * * *